(12) United States Patent
Schulze et al.

(10) Patent No.: US 10,805,615 B2
(45) Date of Patent: Oct. 13, 2020

(54) SYNCHRONIZING VIDEO SIGNALS USING CACHED KEY FRAMES

(71) Applicant: GetGo, Inc., Fort Lauderdale, FL (US)

(72) Inventors: Steffen Schulze, Dresden (DE); Eugen Wige, Kronach (DE)

(73) Assignee: LogMeIn, Inc., Boston, MA (US)

( * ) Notice: Subject to any disclaimer, the term of this patent is extended or adjusted under 35 U.S.C. 154(b) by 563 days.

(21) Appl. No.: 15/378,984

(22) Filed: Dec. 14, 2016

(65) Prior Publication Data

US 2018/0167631 A1 Jun. 14, 2018

(51) Int. Cl.
| | | |
|---|---|---|
| H04N 19/50 | (2014.01) | |
| H04N 19/172 | (2014.01) | |
| H04N 19/105 | (2014.01) | |
| H04L 12/18 | (2006.01) | |
| H04N 21/2187 | (2011.01) | |
| H04N 21/6379 | (2011.01) | |
| H04N 19/164 | (2014.01) | |
| H04N 21/43 | (2011.01) | |
| H04N 21/2343 | (2011.01) | |

(52) U.S. Cl.
CPC ....... *H04N 19/172* (2014.11); *H04L 12/1827* (2013.01); *H04N 19/105* (2014.11); *H04N 19/164* (2014.11); *H04N 21/2187* (2013.01); *H04N 21/2343* (2013.01); *H04N 21/4302* (2013.01); *H04N 21/6379* (2013.01)

(58) Field of Classification Search
CPC combination set(s) only.
See application file for complete search history.

(56) References Cited

U.S. PATENT DOCUMENTS

| | | | |
|---|---|---|---|
| 8,813,160 B2 | 8/2014 | Shang | |
| 8,930,577 B2 | 1/2015 | Ostergren | |
| 2004/0263636 A1* | 12/2004 | Cutler | H04N 7/15 348/211.12 |
| 2009/0190600 A1* | 7/2009 | Akahane | H04L 45/22 370/400 |
| 2010/0098174 A1* | 4/2010 | Adachi | H04N 19/46 375/240.25 |
| 2011/0310217 A1* | 12/2011 | Lee | H04N 19/172 348/14.08 |
| 2012/0069135 A1* | 3/2012 | Cipolli | H04N 19/176 348/14.08 |
| 2013/0117796 A1 | 5/2013 | Qi | |
| 2015/0030306 A1 | 1/2015 | Calvert | |
| 2015/0222684 A1 | 8/2015 | Johansson et al. | |
| 2018/0034594 A1 | 2/2018 | Liu et al. | |
| 2018/0146221 A1* | 5/2018 | Bright-Thomas | H04N 19/51 |

* cited by examiner

*Primary Examiner* — William C Vaughn, Jr.
*Assistant Examiner* — Naod W Belai
(74) *Attorney, Agent, or Firm* — BainwoodHuang

(57) ABSTRACT

A technique for synchronizing video receivers with a video stream already in progress includes caching a key frame in a transport protocol component of a video communication system and providing the key frame on demand to any receiver attempting to join the stream and/or to rejoin the stream after an error, such as a dropped packet. Once a receiver obtains the key frame, the receiver requests that the source of the video stream issue a new sync-point frame, where the sync-point frame depends on the key frame but on no other frame for its content. The receiver may then proceed to display rendered video beginning with the sync-point frame.

23 Claims, 6 Drawing Sheets

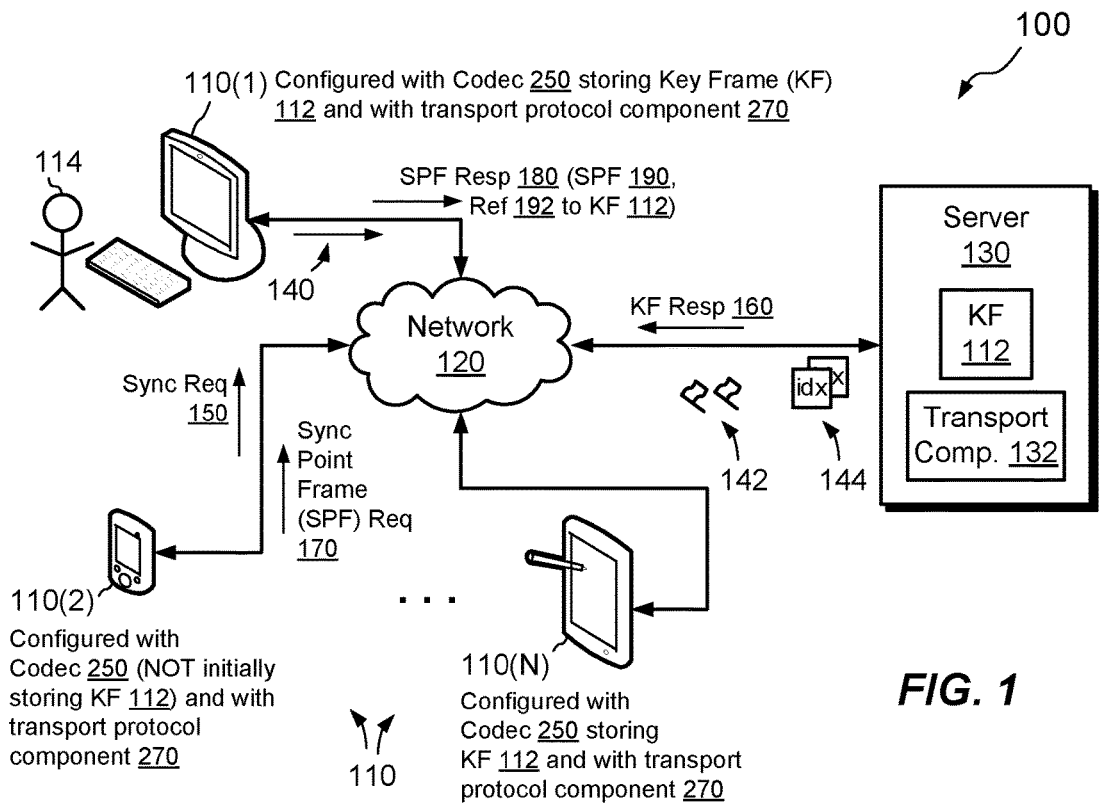
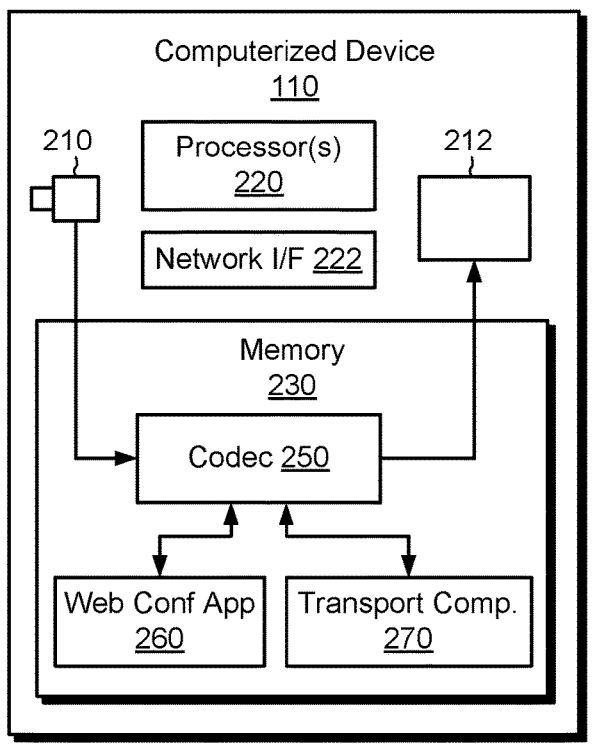
FIG. 2
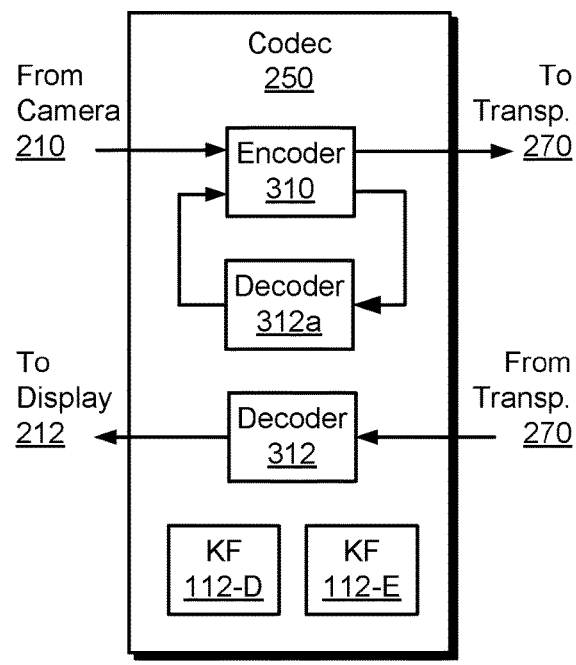
FIG. 3

SYNCHRONIZING VIDEO SIGNALS USING CACHED KEY FRAMES

BACKGROUND

Modern video technology provides many examples in which one video source is distributed to one or more receivers. For example, video streaming services allow users to view the same videos simultaneously. Also, video conferencing services allows each conference participant to project their video to all other participants and, in some cases, to share screen content. Likewise, webcasting services broadcast live video to multiple receivers.

In these kinds of scenarios, which involve video capture and/or broadcast by a sender to one or more receivers, the sender may initiate video transmission by sending a "key frame," i.e., a video frame that provides a complete picture and has no coding dependency on any other video frame. Key frames are independent of other frames from the coding perspective and thus provide useful starting points for later-transmitted frames. Such later frames may be expressed as incremental changes from the key frame and do not need to convey complete encodings of pictures on their own. For example, modern codecs (encoder/decoder devices), such as H.264 and H.265, support P-frames, B-frames, and/or other types of referencing frames. As is known, P-frames refer back to one or more previous frames for their complete content while B-frames refer both forward and back. Video decoders can render P-frames and B-frames as complete pictures by combining their content with referred-to content from other frames. P-frames and B-frames may be arranged in reference chains that include any number of other frames.

SUMMARY

Unfortunately, errors can arise when transmitting encoded video frames. For example, a sender of a video signal may send each such frame as a set of packets to multiple receivers. If a packet is lost in transmission (e.g., on account of network congestion, radio transmission errors, etc.), such that it never arrives at a receiver, the receiver may inform the sender of the lost packet and request that the packet be resent. But resending packets can consume valuable time, and time can be a significant factor in video transmission. Time can be especially significant in real-time applications, such as web conferences and video chat. Depending on the frame rate of the video and the round-trip time between the destination and the source, there may not be enough time for the receiver to obtain a resent packet before packets of a next frame are expected to arrive. As a result, the receiver may be unable to reconstruct a current frame. If the current frame provides a reference to another frame (as is often the case), the error can affect many frames, i.e., any other frames that depend on the current frame. A result is corrupt, choppy, or otherwise inconsistent video.

One solution in such cases is for the receiver to wait until the sender issues a new key frame, which can then serve as a synchronization point for later frames. For example, the video source may be configured to generate key frames on a regular basis, such as once every few seconds. However, key frames tend to be very large compared to incremental frames and transmitting key frames can displace available bandwidth on which other frames rely. Thus, transmitting key frames on a regular basis helps to recover from dropped packets but may result in impaired video quality. For example, a higher level of lossy compression may be applied, and/or frame rate and/or resolution may be decreased, to compensate for the bandwidth displaced by the more frequently-sent key frames.

Similar considerations arise when a new receiver attempts to join a video transmission already in progress. For example, the new receiver has to wait for the next key frame in order to start rendering video. The new receiver may have to wait a long time, if key frames arrive infrequently. If the source issues key frames more frequently, e.g., to anticipate late joiners, dropped packets, and so forth, the same displacement of bandwidth occurs as described above, thus negatively affecting video quality and user experience.

Similar considerations also arise when a receiver attempts to switch from one video stream to another when the two video streams do not share the same key frames. For instance, the source of the video signal may include multiple video encoders, e.g., to support different available receiver bandwidths. If the receiver is connected to a higher-bandwidth stream and experiences a reduction in available bandwidth (e.g., due to high local usage), the receiver may attempt to switch to a lower-bandwidth stream. In this example, the stream switcher is in an analogous position to the late joiner, described above, as the stream switcher is attempting to join a video transmission that is already in progress. In the same manner as described above, the stream switcher needs to wait for the next key frame before decoding can begin.

In contrast with prior approaches for responding to dropped packets, late joiners, and/or stream switchers, an improved technique for synchronizing video receivers with a video stream already in progress includes caching a key frame in a transport protocol component of a video communication system and providing the key frame on demand to any receiver attempting to join the stream and/or to rejoin the stream after an error, such as a dropped packet. Once a receiver obtains the key frame, the receiver requests that the source of the video stream issue a new sync-point frame, where the sync-point frame depends on the key frame but on no other frame for its content. The receiver then proceeds to display rendered video beginning with the sync-point frame.

Although the sync-point frame may be much more recent than the key frame, it is nevertheless likely to be much smaller than the key frame, especially in web conferencing and screen-sharing applications. Transmitting the sync-point frame to the receiver is thus likely to displace much less bandwidth than would be displaced by transmitting the key frame. The improved technique therefor enables receivers to resynchronize after dropped packets using the key frame and the sync-point frame. In some examples, receivers may store key frames locally and thus avoid having to retrieve them from the transport protocol component. Newcomers, such as late joiners and stream switchers, may experience delays as they wait for the key frame to arrive from the transport protocol component, but such delays may be barely perceptible. Also, stream switchers shifting from higher-bandwidth to lower-bandwidth streams have additional capacity in which to carry the key frame, thus allowing a nearly seamless transition from one stream to another.

Certain embodiments are directed to a method of synchronizing video decoders. The method is performed in a real-time video communication system having an encoder, a set of transport protocol components, and at least one decoder. The method includes caching, by a transport protocol component, a key frame of a video signal, the key frame providing a complete representation of a frame of the video signal and having no coding dependency on any other frame of the video signal. In response to a synchronization request from a requesting decoder, the method further includes sending, by the transport protocol component, the key frame to the requesting decoder. After the requesting decoder has received the key frame, the method still further includes directing the encoder to generate a sync-point frame, the sync-point frame having coding dependency on the key frame but on no other frame. The method still further includes conveying the sync-point frame to the requesting decoder, thereby enabling the requesting decoder to proceed in decoding the video signal based on the key frame and the sync point frame.

Other embodiments are directed to a real-time video communication system having an encoder, a set of transport protocol components, and one or more decoders. The system is constructed and arranged to provide synchronization of video decoders, for example, using acts similar to those described in the method above.

Still other embodiments are directed to a computer program product. The computer program product stores instructions which, when executed on control circuitry of a computerized apparatus, cause the control circuitry to perform a method of synchronizing video decoders, such as the method described above.

The foregoing summary is presented for illustrative purposes to assist the reader in readily grasping example features presented herein; however, the foregoing summary is not intended to set forth required elements or to limit embodiments hereof in any way. One should appreciate that the above-described features can be combined in any manner that makes technological sense, and that all such combinations are intended to be disclosed herein, regardless of whether such combinations are identified explicitly or not.

BRIEF DESCRIPTION OF THE SEVERAL VIEWS OF THE DRAWINGS

The foregoing and other features and advantages will be apparent from the following description of particular embodiments of the invention, as illustrated in the accompanying drawings, in which like reference characters refer to the same or similar parts throughout the different views.

FIG. 1 is a block diagram of an example environment in which embodiments of the improved technique hereof can be practiced.

FIG. 2 is a block diagram of an example computerized device, which is representative of the computerized devices shown in FIG. 1.

FIG. 3 is a block diagram of an example codec as shown in FIG. 2.

DETAILED DESCRIPTION OF THE INVENTION

Figure 4:
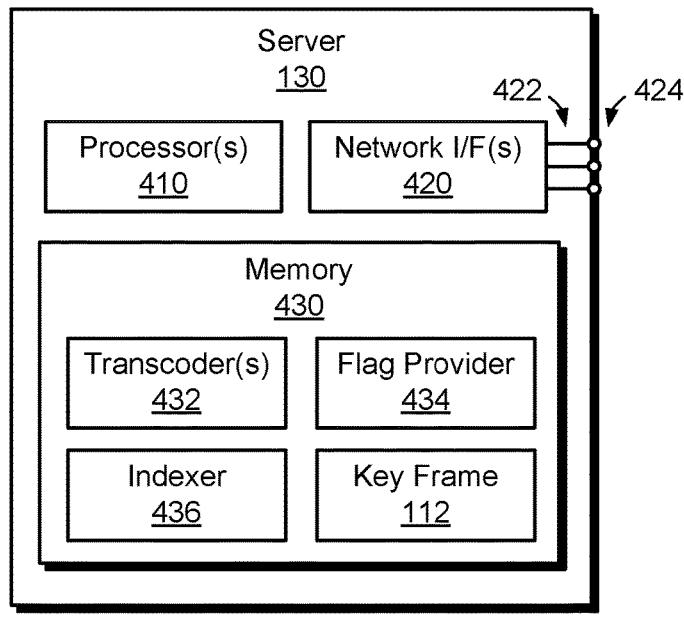
FIG. 4 is a block diagram of an example server, such as that shown in FIG. 1.

Embodiments of the invention will now be described. It should be appreciated that such embodiments are provided by way of example to illustrate certain features and principles of the invention but that the invention hereof is not limited to the particular embodiments described.

An improved technique for synchronizing video receivers with a video stream already in progress includes caching a key frame in a transport protocol component of a video communication system and providing the key frame on demand to any receiver attempting to join the stream and/or to rejoin the stream after an error, such as a dropped packet.

FIG. 1 shows an example environment 100 in which embodiments of the improved technique hereof can be practiced. Here, multiple computerized devices 110, shown as devices 110(1) through 110(N), connect to a network 120. Each of devices 110(1) through 110(N) includes or otherwise has access to a video codec 250 and a transport protocol component 270. Such transport components 270 are software components that operate in accordance with a network protocol model, such as the OSI (Open Systems Interconnection) model, and facilitate communications among network-connected elements in the environment 100. In some examples, the environment 100 also includes a server 130, which is configured to receive and distribute video content over the network 120. For example, the server 130 may receive an encoded video signal 140 from a device 110 and transmit the video signal 140 to other devices 110. If provided, the server 130 itself includes a transport protocol component 132 to facilitate video transport. One should appreciate, however, that the server 130 may be omitted in some embodiments, e.g., with video senders and receivers connecting and communicating point-to-point. In such cases, the functions ascribed herein to the server 130 may instead be performed by the computing devices 110 directly.

Computerized devices 110 may be provided in any number and in any suitable form or forms, such as desktop computers, laptop computers, smartphones, tablets, PDAs (personal data assistants), televisions, set-top boxes, and the like. The network 120 may be implemented using any medium capable of conveying video data, such as a computer network (WAN, LAN, the Internet, etc.), a cable television network, a satellite network, a cell phone network, an over-the-air broadcast network, or any type of network or combination of networks.

In some examples, the codec 250 and transport component 270 in each of devices 110(1) through 110(N) enable the respective device to act as a sender of video content and/or as a receiver of video content. For instance, the codec 250 in device 110(1) may include an encoder that encodes video captured by a webcam or other camera. A transport component 270 in device 110(1) may send the encoded video over the network 120 to the server 130, which broadcasts the encoded video to each of the other devices 110(2) through 110(N). Transport components 270 on devices 110(2) through 110(N) may receive the video, and codecs 250 on devices 110(2) through 110(N) may decode the video. Users of these other devices can view decoded video on their respective displays. In some examples, devices 110 may process raw video from a camera, webcam, screen, etc., prior to providing such video to the codec 250 for encoding. Likewise, devices 110 may process decoded video from the codec 250 prior to displaying such video.

Some systems support multiple senders simultaneously. For instance, each of devices 110(1) through 110(N) may send video acquired from a respective webcam and may simultaneously receive and decode video captured by a webcam on each of the other devices.

Some video may include screen information. For example, a video stream from device 110(1) may encode content displayed on that device's screen. Although each of devices 110(1) through 110(N) may be configured as both a sender and a receiver of video content, some devices may alternatively be configured only as senders and others may be configured only as receivers. Thus, uses for embodiments may range from peer-to-peer situations, such as web conferencing and video chat, to broadcast situations, such as multicasting and video streaming.

In example operation, devices 110(1) through 110(N) participate in a web conference. Devices 110(1) and 110(N) join the conference first. User 114 operates controls on device 110(1) to share the screen of device 110(1). These acts cause the codec 250 on device 110(1) to encode screen content of device 110(1), which sends the screen content in a video signal 140 to server 130 (assuming the server is used). Server 130 receives the video signal 140 and dispatches it to other connected participants.

Sometime after screen-sharing has been established, device 110(2) joins the conference late. The decoder in device 110(2) should ideally begin decoding the video signal immediately, so that the user of device 110(2) can see the screen of device 110(1). But because the device 110(2) joined the conference late, the decoder is missing the key frame and any intervening frames needed to begin decoding the video signal 140.

In accordance with improvements hereof, a transport component, such as component 132 running on the server 130 or a component 270 on any of the devices 110, caches a key frame 112, i.e., one that it previously received from the encoder running in the codec 250 of device 110(1). The key frame 112 may be in encoded form and is preferably the most recent key frame generated by the encoder, although this is not required, as older key frames may also be used.

To begin decoding the video signal 140, device 110(2) sends a sync request 150 to the transport component that caches the key frame 112, e.g., on server 130. The transport component receives the sync request 150 and replies by sending a key frame response 160. The key frame response 160 includes a copy of the cached key frame 112.

Once the device 110(2) has received the key frame 112, the device 110(2) issues a sync-point frame (SPF) request 170. The SPF request 170 is a request to the encoder in device 110(1) to generate a new sync-point frame 190, i.e., a new frame that depends upon the key frame 112 but upon no other frame. For example, the encoder in device 110(1) computes the sync-point frame 190 based on a difference between a frame of raw video (e.g., from the local webcam) and the key frame 112. The sync-point frame 190 thus encodes current video content but presents that content in differentially encoded form relative to the key frame 112. In an example, the sync-point frame 190 is an ordinary P-frame that has only a single reference, which is to the key frame 112. The encoder in device 110(1) then generates the new sync-point frame 190 using the key frame 112 as its sole reference, and device 110(1) issues an SPF response 180. The SPF response 180 includes the new sync-point frame 190. In some examples, SPF response 180 also includes a reference 192 to the key frame 112. In other examples, the reference 192 is implied from circumstances and/or communication between codecs on devices 110(1) and 110(2). Device 110(2) receives the sync-point frame 190 and renders this frame by referring to its own copy of the key frame 112, i.e., the copy that it received in key frame response 160. As the sync-point frame 190 contains current video data, the decoder can proceed in decoding later-arriving video frames, which will reference the sync-point frame 190, the key frame 112, and/or later frames, but will not reference frames that the decoder in device 110(2) has not received.

In an example, the codec on device 110(1) erases all frames from its reference buffer except the key frame 112 when it generates the sync-point frame 190. Such erasure of reference frames guarantees that no frames encoded from that point forward will depend on any frames prior to the sync-point frame 190, except the key frame 112. In this manner, the codec on device 110(1) becomes synchronized with the codec on device 110(2).

In an example, the sync-point frame 190 is not specific to the decoder on device 110(2) but rather applies to all decoders receiving the video signal 140. For instance, once the encoder on device 110(1) resyncs to the key frame 112 by generating a sync-point frame 190, all decoders listening to that encoder are likewise resynced to their respective copies of the key frame 112 (which have been received earlier). All decoders can thus proceed in parallel, receiving the same frames with the same references.

The above-described activities highlight a preference for the encoder in device 110(1) and for all listening decoders to each store the key frame 112 locally. As SPF requests 180 may arrive at the encoder at any time, the encoder on device 110(1) should preferably have fast access to the key frame 112, so that it can generate a new sync-point frame 190 without having to request the cached key frame 112 from the transport component that caches it. Likewise, decoders should preferably keep the key frame 112 on hand, such that they are able to decode newly arriving sync-point frames 190, e.g., those which result from SPF requests 180 issued by decoders attempting to sync or resync with the video signal 140.

In some examples, the sender of the key frame 112 instructs any codec 250 receiving the key frame 112 to store the key frame 112 in its reference frame buffer for some period of time and/or until it receives a newer key frame 112. For example, transport component 132 in server 130 (or 270 in device 110(1)) sets a flag 142 in the header of each key frame to mark that frame for extended storage. Decoders on devices 110 that receive frames in which the flag 142 is set respond by avoiding deletion of that frame from their reference frame buffers for some period of time and/or until the arrival of another flagged frame.

Although the example described above relates to a late joiner to a web conference, one should appreciate that the same actions may be performed for a stream switcher. For example, consider the case where device 110(2) is not a late joiner but rather was previously receiving a higher-quality version of the video signal 140 and experienced bandwidth limitations, such that it became necessary to shift down to a lower-quality signal. The stream switcher may disconnect from the higher-quality signal and attempt to connect to the lower-quality signal, e.g., to the video signal 140. At this point, the stream switcher is indistinguishable from the late joiner, as they both attempt to connect to a video stream that is already in progress. For example, the stream switcher sends a sync request 150, receives a key frame response 160, sends an SPF request 170, and receives an SPF response 180, in the same manner as described above. Once the device 110(2) has received the SPF response 180, it may begin decoding video of the video signal 140.

The arrangement of FIG. 1 also supports recovery from errors, such as dropped packets. For example, any device 110(2) to 110(N) detecting a dropped packet can issue an SPF request 170 to the encoder in device 110(1). Upon receipt of a new sync-point frame 190, the decoder on the device that detected the dropped packet can resume decoding based on the new sync-point frame 190 and on its own stored key frame 112.

In some examples, further improvements are facilitated by a transport component 132 or 270 appending indices 144 to frames, e.g., in frame headers, with the indices 144 specifying desired levels of transport reliability. For example, frames may be marked by an index 144 as "reliable," meaning that any dropped packets must be resent, e.g., until they successfully reach their destinations or until a time-out occurs, which would indicate an error. In an example, frames marked as reliable are sent using TCP (Transmission Control Protocol).

The transport component 132 or 270 may mark other frames as "semi-reliable." A semi-reliable frame is one whose packets are resent if dropped, but only for so long as doing so does not interfere with arrival of a next frame. For example, a device 110 receiving a semi-reliable frame directed to its decoder may retry a dropped packet if the round-trip time to the encoder and back over the network 120 is less than the time remaining until the next frame is scheduled to arrive (e.g., based on the frame rate of the video signal). If the device determines that there is not enough time until the next frame arrives, the device stops retrying. If the frame with the dropped packet is referenced by later frames, the device may attempt to resync with the encoder, e.g., by issuing an SPF request 170, as described above.

The transport component 132 or 270 may further mark some frames as "unreliable." If a device detects a dropped packet of an unreliable frame directed to its decoder, the device tolerates the loss and keeps going, without requesting that the packet be resent. The device may resync if necessary. In an example, frames marked as unreliable are sent using UDP (User Datagram Protocol).

In an example, transport components 132 and/or 270 send key frames with reliable indices 144, on account of the essential nature of key frames in the decoding process. Also, transport components send sync-point frames 190 with semi-reliable indices 144. If a decoder fails to receive a packet of a sync-point frame 190 even after retrying, the decoder may simply request a newer sync-point frame 190. Requesting a newer sync-point frame 190 may be a better choice than continuing to retry a current one, as the newer sync-point frame will reflect a newer state of the video signal whereas the current one will fall behind. In an example, transport components send other frames (neither key frames nor sync-point frames) as semi-reliable or as unreliable, depending on whether the frames will act as reference frames to other frames. The transport components send referenced frames with semi-reliable indices 144 and send unreferenced frames with unreliable indices 144.

FIG. 2 shows an example computerized device 110 in greater detail. The computerized device 110 is intended to be a generalized representation of devices 110(1) through 110(N) of FIG. 1, although it is recognized that the specific implementations of these devices may differ.

The computerized device 110 includes a camera 210, such as a built-in webcam or other camera, and a display 212, such as a computer monitor, screen, touchscreen, projector, television, or the like. The computerized device 110 also includes a set of processors 220 (i.e., one or more processing chips and/or assemblies), a network interface 222, and memory 230. The memory 230 includes both volatile memory (e.g., RAM) and non-volatile memory, such as one or more disk drives, solid state drives, and the like. The set of processors 220 and the memory 230 together form control circuitry, which is constructed and arranged to carry out various methods and functions as described herein. Also, the memory 230 includes a variety of software constructs realized in the form of executable instructions. When the executable instructions are run by the set of processors 220, the set of processors 220 are caused to carry out the operations specified by the software constructs. Although certain software constructs are specifically shown and described, it is understood that the memory 230 typically includes many other software constructs, which are not shown, such as an operating system and various applications, processes, daemons, and so forth.

As further shown in FIG. 1, the memory 230 "includes," i.e., realizes by execution of software instructions, the above-described codec 250 and transport component 270, as well as a web conferencing application 260. The codec 250 is configured to receive input from the camera 210, e.g., in a raw video format, and to compress the raw video for transmission to other devices 110, e.g., via the network interface 222. The codec 250 is also configured to receive compressed video from other devices 110, e.g., via the network interface 222, and to decompress the received video. The computerized device 110 is further configured to provide decompressed video to the display 212 for presentation to a user. In an example, the transport component 270 includes one or more device drivers for the network interface 222 and/or other software constructs for implementing a transport layer of a network protocol, such as the OSI protocol.

In some examples, the web conferencing application 260 operates in coordination with the codec 250 to send and receive video signals. The video signals may include live camera video as well as screen content of any displayed applications, windows, or desktops.

FIG. 3 shows an example implementation of the codec 250 in additional detail. Here, the codec 250 includes an encoder 310 and a decoder 312. The encoder 310 is configured to compress video signals, e.g., from the camera 210, from screen content, and/or from other sources, and the decoder 312 is configured to decompress video signals arriving from other devices. The codec 250 further includes a second decoder 312a. The second decoder 312a is similar to the decoder 312 and assists the encoder 310 in compressing video, e.g., by replicating operation of remote decoders that decompress video compressed by the encoder 310. In some examples, the encoder 310 receives output from the decoder 312a and applies the output to make predictions and/or to adjust the manner in which the encoder 310 performs compression.

In the example shown, the encoder 310 has two outputs: a first output that carries compressed video data that is entropy-encoded and a second output that carries compressed video data that is not entropy encoded. The entropy-encoded output is provided for efficient transmission over the network 120, and the non-entropy-encoded output is provided as input to the second decoder 312a for internal use. As with conventional designs, the decoder 312 in codec 250 includes an entropy decoder (not shown) at its input, for decoding entropy-encoded video arriving over the network 120. The second decoder 312a does not have an entropy encoder at its input, as it is limited to receiving non-entropy-encoded input signals from the encoder 310.

As further shown in FIG. 3, codec 250 includes one or more stored versions of the key frame 112. For example, a decompressed version 112-D of the key frame may be stored in a reference frame buffer of the encoder 310, of decoder 312, of decoder 312a, or of all of these. Alternatively, or in addition, the codec 250 may store a compressed (encoded) version 112-E of the key frame. As will be described, both the decompressed version 112-D and the compressed version 112-E can be made available to the encoder 310 to induce the encoder 310 to generate a sync-point frame 190. The key frames 112-D and/or 112-E can be also be made available to the decoder 312 for use in reconstructing sync-point frames received from encoders on other devices 110.

The codec 250 may be implemented using electronic circuitry of any kind, whether computerized or not. Further, the encoder 310 and the decoders 312 and 312a may be implemented separately or together. Thus, the provision of the encoder 310 and decoders 312 and 312a together and within the computerized device 110 should be regarded as merely an example. In some cases, multiple instances of the codec 250 are provided, i.e., for supporting multiple simultaneous video streams.

FIG. 4 shows an example of the server 130 in additional detail. Here, the server 130 is seen to include a set of processors 410 (i.e., one or more processing chips and/or assemblies), a set of network interfaces 422, physical connectors 424, and memory 430. Like the memory 230 of the computerized device 110, the memory 430 includes both volatile memory (e.g., RAM) and non-volatile memory, such as one or more disk drives, solid state drives, and the like. Also, the set of processors 420 and the memory 430 together form control circuitry, which is constructed and arranged to carry out various methods and functions as described herein. The memory 430 includes a variety of software constructs realized in the form of executable instructions. When the executable instructions are run by the set of processors 420, the set of processors 420 are caused to carry out the operations specified by the software constructs.

In an example, the memory 430 "includes," i.e., realizes by execution of software instructions, one or more transcoders 432, a flag provider 434, an indexer 436, and a cached key frame 112, which may be stored in a register or other memory device. The transcoders 432 render a video signal (such as signal 140 of FIG. 1) as multiple signals with respective bandwidth levels, and dispatch different signals to different decoders, based, for example, on network bandwidth available at the locations of the respective decoders. Flag provider 434 applies the above-described flags 142 to frame headers (FIG. 1), i.e., to identify key frames that are to be stored by receiving codecs for longer than usual. Indexer 436 applies indices 144 to frame headers, to specify a desired level of transport reliability. For example, indexer 436 may apply a first index 144 to indicate a reliable transport, a second index 144 to indicate a semi-reliable transport, and a third index 144 to indicate an unreliable transport.

In some examples, the server 130 transmits frames of different reliability levels on respective logical channels 422. For example, one channel may be dedicated to reliable frames, another to semi-reliable frames, and yet another to unreliable frames. Different logical channels may be supported by different logical connections and/or protocols, e.g., some by TCP, some by UDP, etc. In some examples, the server 130 transmits frames of different reliability levels on respective physical connections 424. Such physical connections 424 may be realized as respective physical ports, connectors, and the like. In addition, one logical channel may be designated as a side channel, which may be used for sending content out of band with video streams. In some examples, the side channel is realized as a separate physical channel, and may connect to the network 120 using a different technology from the one (or ones) used for video streams.

The server 130 may be implemented using a single computing machine or using multiple computing machines which operate in a coordinated fashion to achieve the functionality described. Also, as noted above, the server 130 may be excluded in some embodiments. Further, any of the functions described herein for the server 130, i.e., those of transcoders 432, flag provider 434, indexer 436, logical channels 422, and physical channels 424, may alternatively be provided by any of devices 110, or by both devices 110 and server 130, in any combination.

Figure 5:
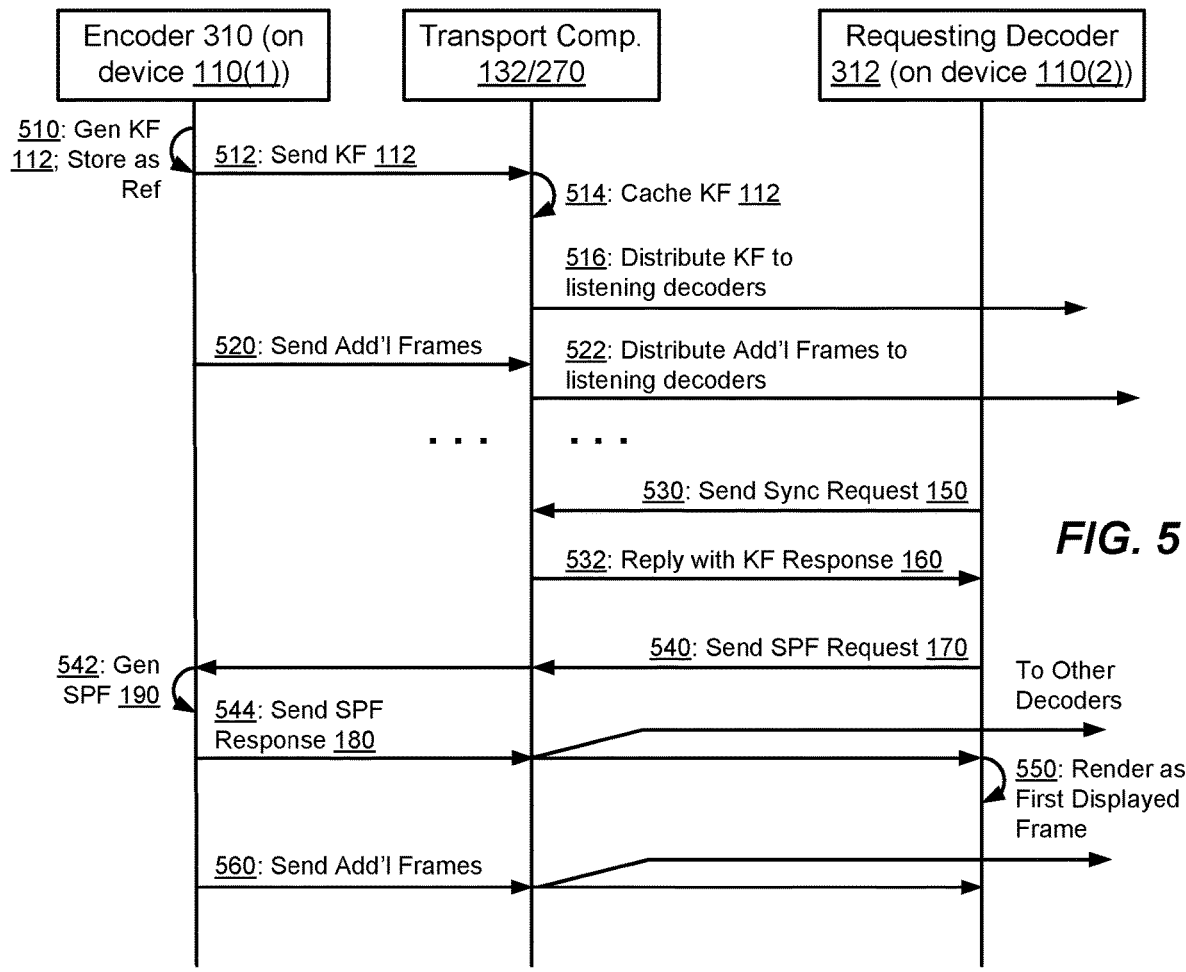
FIG. 5 is a sequence diagram showing an example sequence of activities for enabling late joiners and stream switchers to join a video transmission already in progress.
Figure 6:
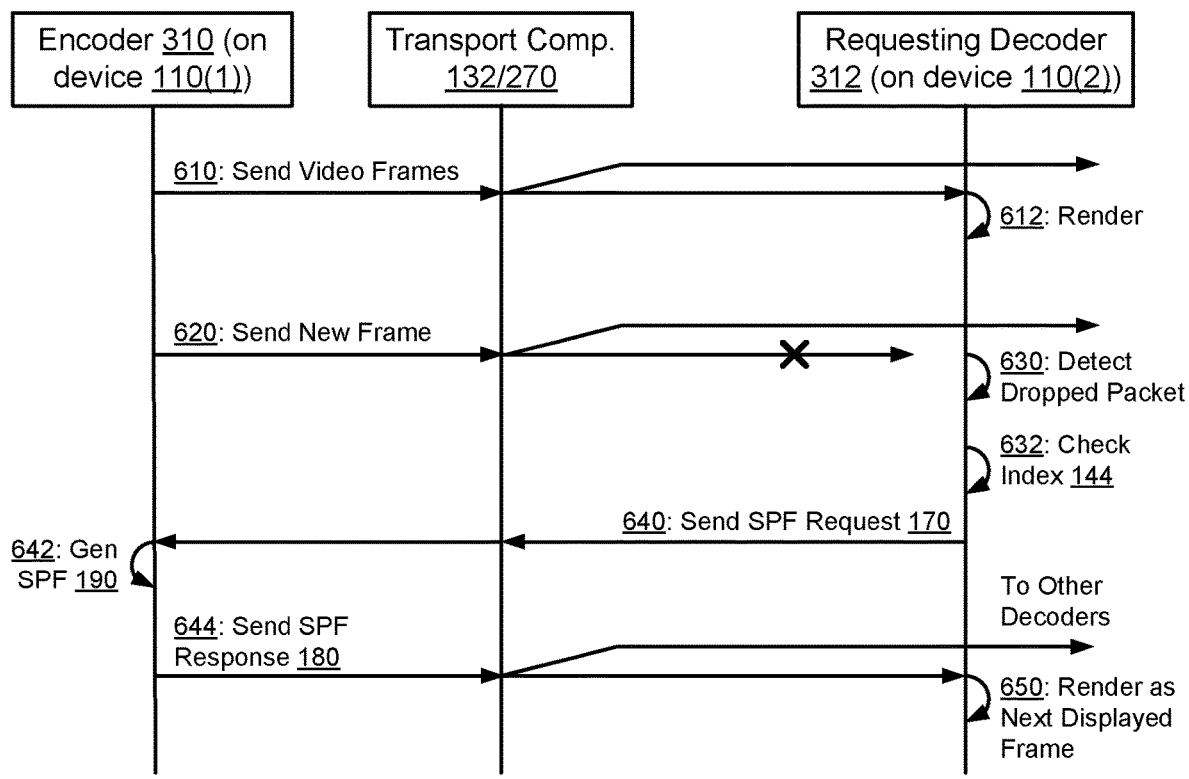
FIG. 6 is a sequence diagram showing an example sequence of activities for enabling a receiver to resynchronize with a video transmission after an error, such as a dropped packet.

FIGS. 5 and 6 show example sequences of activities among an encoder 310, a transport component 132 or 270, and a requesting decoder 312. The encoder 310 may reside in any one of the computing devices 110(1) to 110(N), and the requesting decoder 312 may reside in any other one of the computing devices 110(1) to 110(N), i.e., the encoder 310 and the requesting decoder 312 reside in different devices. For consistency with previous examples and without intending to be limiting, it may be assumed that the encoder 310 resides in the codec 250 of device 110(1), and that the requesting decoder 312 resides in the codec 250 of device 110(2), but this arrangement is not required. The numbered acts of FIGS. 5 and 6 are ordered in example sequences. Those skilled in the art will recognize that the orders of these acts may be varied according to the principles disclosed herein, such that the orders of acts as presented should be regarded as merely illustrative.

In the case of FIG. 5, the requesting decoder 312 may be a newcomer to a video signal (e.g., the video signal 140), such as a late joiner, a stream switcher, or a decoder that joins a video stream in progress for any other reason.

At 510, the encoder 310 generates a key frame 112. The encoder 310 may store the new key frame 112 in its internal reference frame buffer or elsewhere, such as in a register or other location reserved for this purpose.

At 512, the encoder 310 provides the new key frame 112 to the transport component 132/270 (e.g., over the network 120 to server 130 and/or via internal messaging from the encoder 310 to the transport component 270). The transport component 132/270 caches the key frame 112 at 514, e.g., by storing the key frame 112 in a register.

At 516, the transport component 132/270 distributes the key frame 112 to all listening decoders, e.g., to all decoders 312 of devices 110(3) to 100(N) currently connected to the video stream, such as those which have already joined a web conference. Any such decoders then store the key frame 112, e.g., in decoded form in their respective frame reference buffers, or in some other form or location. In an example, the transport component 132/270 sends/distributes the key frame 112 as part of a real-time video transmission and in accordance with a preset frame rate. Thus, the key frame 112 may be provided as one of a sequence of frames of the video signal 140.

At 520, the encoder 310 generates additional frames, of any number and of any kind. At 522, the transport component 132/270 sends/distributes the additional frames, e.g., one at a time in accordance with the frame rate, to the listening decoders, which receive, process, and render the frames in the usual manner.

At some later time, as indicated by act 530 and while the video signal 140 is already in progress, the computing device 110(2) of the requesting decoder 312 sends a sync request 150. The transport component 132/270 receives the sync request 150 and, at 532, replies by sending a key frame response 160. The key frame response 160 includes a copy of the cached key frame 112. The requesting decoder 312 receives the cached key frame 112.

At 540, the device 110(2) of the requesting decoder 312 sends an SPF request 170. The device 110(1) receives the SPF request 170.

At 542, the encoder 310 responds to the request 170 by generating a new sync-point frame 190, e.g., based on a current frame of raw video and with reference only to the key frame 112. For example, the encoder 310 renders the sync-point frame 190 as a P-frame, whose only reference is the key frame 112. When generating the sync-point frame 190, the encoder 310 may erase all other frames in its reference frame buffer except the key frame 112, to ensure that no future frames are generated with reference to frames that the requesting decoder 312 does not possess.

At 544, the device 110(1) provides an SPF response 180, and the transport component 132/270 distributes the sync-point frame 190 to all listening decoders, which now include the requesting decoder 312.

At 550, the requesting decoder 312 receives the sync-point frame 190, renders the sync-point frame with reference to the earlier-received key frame 112, and outputs the rendered frame for display to a user. Although the requesting decoder 312 could also display the key frame 112, the requesting decoder 312 generally does not do so, as the key frame 112 is typically much older than the sync-point frame 190, such that displaying the key frame 112 would result in an obvious discontinuity in the displayed video.

At 560, the encoder 310 generates and outputs additional frames, e.g., in response to raw video received from the camera 210. The transport component 132/270 receives and distributes the additional frames to all listening decoders, including the requesting decoder 312. The requesting decoder 312 then proceeds in decoding and rendering frames in parallel with other decoders.

Although the example of FIG. 5 involves a system having multiple decoders, the same principles apply for a single decoder. For example, the requesting decoder 312 may be the only decoder receiving the video signal 140 and may enter and exit the same stream multiple times (e.g., by shifting between different quality levels).

FIG. 6 shows an example sequence for responding to an error that causes a loss of synchronization, such as a dropped packet. At 610, the encoder 310 generates video frames in the usual manner, and the transport component 132/270 distributes those video frames to all listening decoders. The listening decoders include the requesting decoder 312, which renders received video frames (act 612) in parallel with the other decoders.

At some point in video transmission, an error occurs when transmitting a new frame (at 620), such that the device 110(2) of requesting decoder 312 expects a packet but does not receive one.

At 630, the device 110(2) detects the dropped packet. For example, the device 110(2) may be configured to receive new packets within specified timing windows, such that a failure to receive a packet within a particular timing window indicates that the packet has been dropped.

At 632, the device 110(2) checks the index 144, e.g., which was provided in the header of the new frame. Depending on the index 144, the device 110(2) may request that the packet be resent (e.g., if the index indicates reliable or semi-reliable transport), or may simply proceed (e.g., if time runs out or if the index indicates unreliable transport). In this example, the index 144 indicates the semi-reliable transport but the time for resending the packet has run out, such that obtaining the dropped packet is not possible. To recover from the dropped packet, the requesting decoder 312 requires a new sync-point frame 190.

At 640, the device 110(2) issues an SPF request 170. In a manner similar to that described in connection with FIG. 5, the encoder responds to the SPF request 170 by generating a new sync-point frame 190 (act 642). At 644, an SPF response 180 is sent to the transport component 132/270, where it is distributed to all listening decoders, including the requesting decoder 312.

At 650, the requesting decoder 312 receives the new sync-point frame 190 and renders the frame for display. The requesting decoder 312 thus becomes resynchronized with the video signal 140 and proceeds in parallel with any other listening decoders.

As with the arrangement of FIG. 5, the arrangement of FIG. 6 may also be realized with a single decoder. Thus, embodiments hereof are not limited to cases involving multiple decoders.

Figure 7:
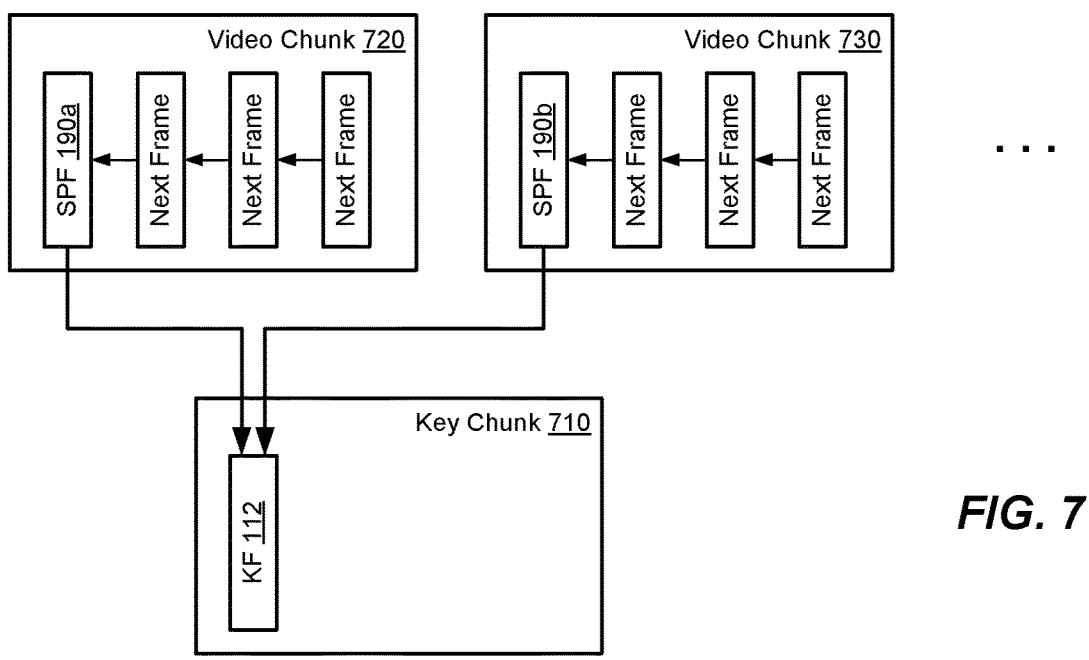
FIG. 7 is a block diagram showing an example arrangement for transmitting streaming video using key frames and sync-point frames as described herein.

FIG. 7 shows another useful application of sync-point frames. Here, the illustrated scenario relates to video streaming, where video frames are commonly provided in "chunks," i.e., sequences of consecutive frames typically extending over several seconds. Prior video streaming solutions provide a key frame as the first frame of each chunk, thus allowing frame dependencies within chunks but not between chunks.

In accordance with the example embodiment of FIG. 7, however, a video streaming service may provide a key chunk 710 which includes a key frame. Subsequent chunks (e.g., video chunks 720 and 730) each begin with a respective sync-point frame (e.g., 190*a*, 190*b*, etc.) that references only that key frame in chunk 710. Within each video chunk (720, 730, etc.), frames may reference the respective sync-point frame but do not reference frames in other chunks, except that each sync-point frame references the key frame in chunk 710. The arrangement of FIG. 7 thus avoids repeatedly sending key frames and thus avoids the accompanying displacement of bandwidth. As a result, video quality may be improved, as the bandwidth conserved by avoiding frequent transmission of key frames may be used instead for transmitting higher-quality images. This arrangement is particularly well-suited for video chat, web conferencing, screen sharing, and the like, where large proportions of video images may remain constant for long periods of time.

Figure 8:
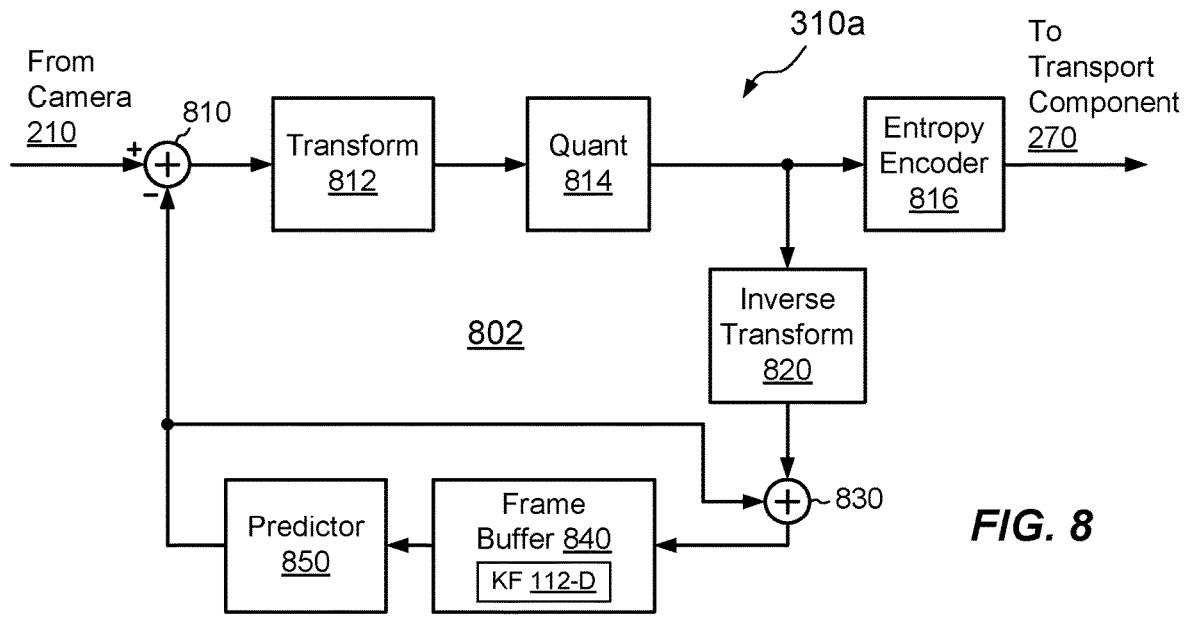
FIG. 8 is a block diagram showing portions of an example encoder configured to apply a key frame as a reference frame when generating a sync-point frame.
Figure 9:
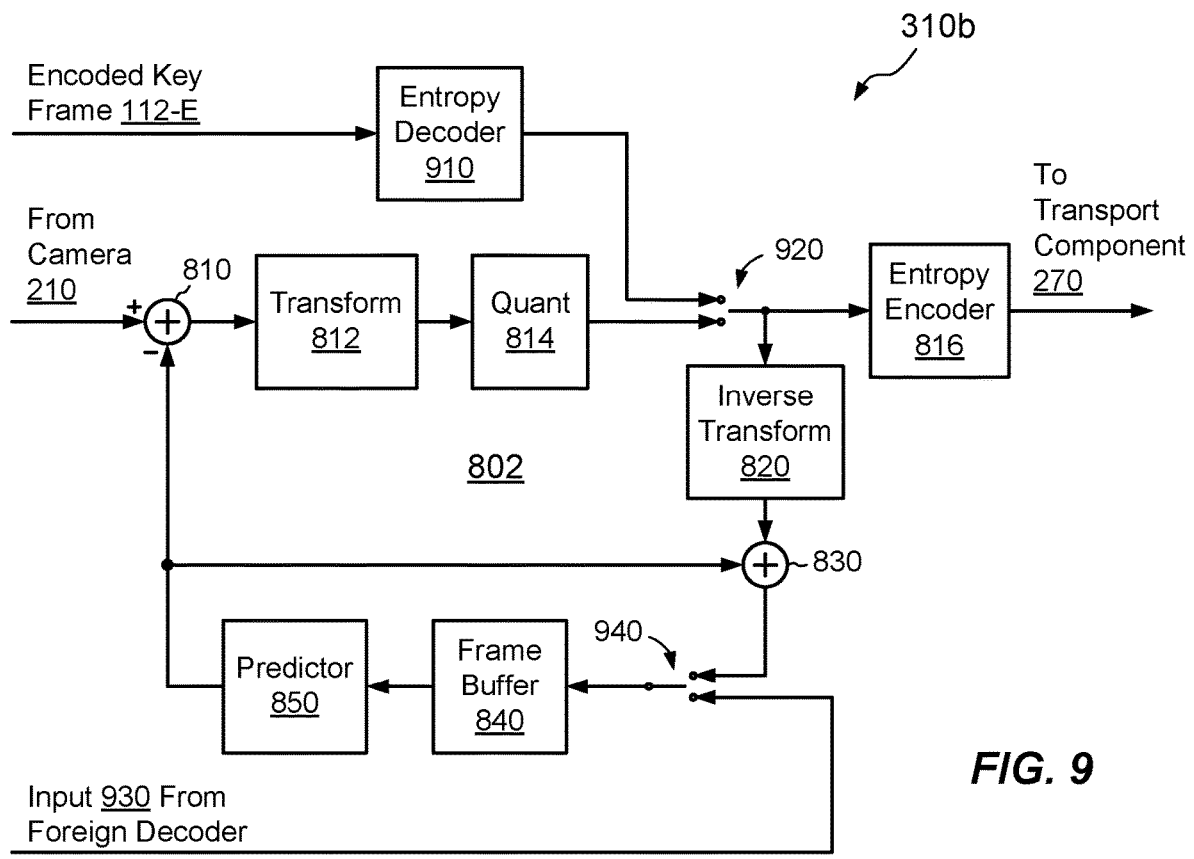
FIG. 9 is a block diagram showing portions of an example encoder configured to apply an encoded key frame as input for generating a sync-point frame.

FIGS. 8 and 9 show example partial implementations of the encoder 310 of FIG. 3 in additional detail. The arrangement of FIG. 8 stores the key frame 112 in a reference frame buffer 840 in decoded form (112-D), whereas the arrangement of FIG. 9 injects an encoded version 112-E of the key frame into a main loop of the encoder 310. Some details are omitted from these figures, such as those concerning decoders 312*a* used in connection with the illustrated encoders. Such decoders may be implemented in a conventional manner.

Beginning with FIG. 8, encoder 310*a* includes the following elements:

Summer 810, e.g., for generating a difference between a current frame from camera 210 and a predicted frame;

Transform Block 812, e.g., for performing a discrete cosine transform or other two-dimensional transform;

Quantization Block 814, e.g., for rounding frequency components produced by transform block 812 to achieve lossy compression;

Entropy Encoder Block 816, e.g., to perform lossless compression on the results of quantization;

Inverse-Transform Block 820, e.g., for performing an inverse-transform on the quantized data, thus producing reconstructed video as seen by a decoder);

Summer 830, e.g., for combining predictions and/or estimations with reconstructed versions of encoded frames;

Reference Frame Buffer 840, e.g., for storing previously decoded frames; and Predictor 850, e.g., for performing intra-frame and/or inter-frame prediction and/or estimation.

All elements described above, except for the entropy decoder 816, form a main loop 802 of the encoder 310a. Using the pictured arrangement, encoder 310a transforms and compresses input frames (e.g., frames arriving from camera 210) and uses other frames from reference frame buffer 840 to predict new frames. The encoder 310a subtracts the predictions from the new frames to produce much smaller residual frames and compresses the residual frames. A decoder receiving a compressed residual frame may have the same contents in its own reference frame buffer and may generate the same predictions as were made by the encoder 310a. The decoder decompresses the residual frames and adds the predictions to reconstitute versions of the original frames. This form of residual-based encoding is common to many modern codecs, such as H.264 and H.265, for example.

Because the reference frame buffer 840 stores the decoded key frame 112-D, the key frame is available to the encoder 310 for use as a reference frame in generating new frames. Such new frames may include sync-point frames 190.

In example operation, the computing device containing the encoder 310a receives an SPF request 170 to generate a new sync-point frame 190. In response, the encoder 310a selects the decoded key frame 112-D as a sole reference frame from buffer 840 and may preferably erase all other reference frames in the buffer 840. The key frame 112-D (or a prediction based thereon) is provided to summer 810, which outputs a residue frame that describes a difference between a current frame (e.g., of live video from camera 210) and the key frame 112-D (or the prediction therefrom). The encoder 310a then transforms, quantizes, and entropy encodes the residual frame, with the result being the requested sync-point frame 190.

Although the foregoing description describes operation on video frames, one skilled in the art will appreciate that encoders may break down frames into smaller units, such as "blocks," e.g., smaller 2-dimensional arrays of pixels, and process each frame on a per-block basis. The above-described frame-based operations may thus represent aggregations of many block-based operations.

Turning now to FIG. 9, a similar arrangement is seen, with similarly labeled elements performing similar functions as those described above. In this case, however, encoder 310b includes an additional entropy decoder 910, as well as switches 920 and 940.

In example operation, entropy decoder 910 receives an encoded key frame 112-E, which may be stored locally, and performs lossless decompression on the encoded key frame 112-E to render it in a format compatible with output from the quantization block 814. Note that entropy decoder 816 does not perform a full decompression, as the output of entropy decoder 910 is still highly compressed as a result of quantization.

When switch 920 assumes the down position and switch 940 assumes the up position (from the perspective shown), the encoder 310b operates in a manner similar to that of the encoder 310a. With these settings, the entropy decoder 910 is ignored. However, changing the switch 920 to the up position engages the entropy decoder 910 and injects the entropy-decoded key frame 112-E as input into the main loop 802. As a result, inverse transform block 820 converts the encoded key frame 112-E to decoded form (that of 112-D), and the decoded result is stored in the reference frame buffer 840. Preferably, other frames are deleted from the buffer 840 at this time, such that the next frame to be encoded can be referenced only to the key frame. Switch 920 may then be changed back to the down position, and the next frame to be generated by the encoder 310b provides the requested sync-point frame.

Other interesting and useful features may be provided by switch 940. For example, by changing switch 940 to the down position, input frames 930 from a foreign decoder may be stored in reference frame buffer 840, thereby enabling the encoder 310b to generate new frames based, in whole or in part, on frames produced by other decoders.

Figure 10:
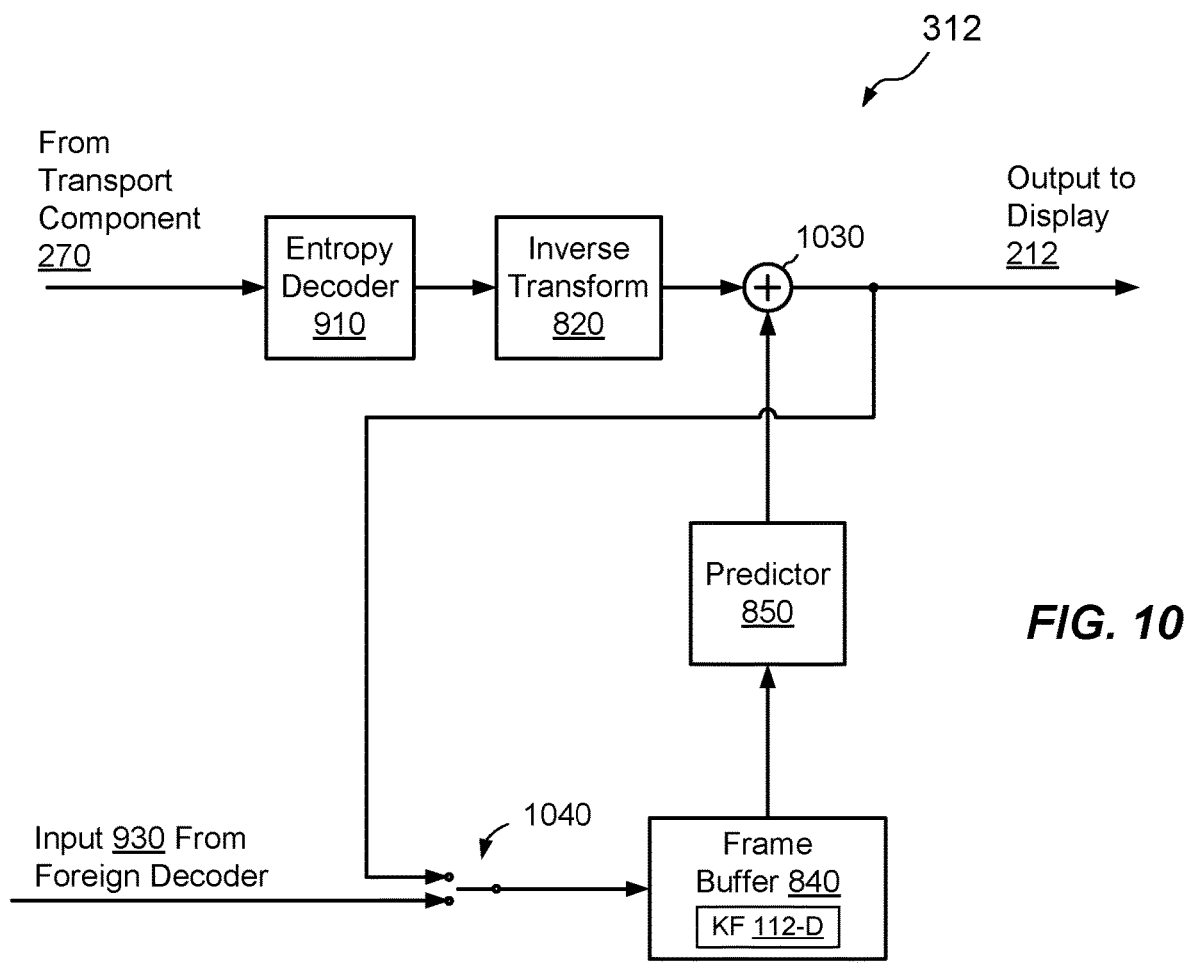
FIG. 10 is a block diagram showing portions of an example decoder configured to apply a key frame as a reference frame when rendering a sync-point frame.

FIG. 10 shows an example decoder 312 in further detail, with like reference numerals referring to similar elements. In the pictured arrangement, entropy decoder 910 receives encoded video from the transport component 270, and inverse transform block 820 performs an inverse transform on the entropy-decoded result. The output of block 820 thus provides a decoded residual frame. Predictor 850 generates a predicted frame, and summer 1030 combines the predicted frame with the residual frame (from block 820) to produce a reconstructed frame, which is output to display 212 (subject to any desired post-processing).

Predictor 850 selects and/or generates predictions based on previous frames stored in frame buffer 840. In an example, these previous frames include the decoded version 112-D of the key frame. Thus, in this example, the key frame may be available immediately to the decoder 312 without the decoder 312 having to receive it from a transport component.

As further shown, the frame buffer 840 may receive frames for storage from either the output decoder 312 or from the input 930, based on the position of switch 1040. As in FIG. 9, the input 930 provides frames from a foreign decoder.

In an example, decoder 312a (FIG. 3) is identical to decoder 312 as pictured in FIG. 10, except that decoder 312a does not include the entropy decoder 910.

Figure 11:
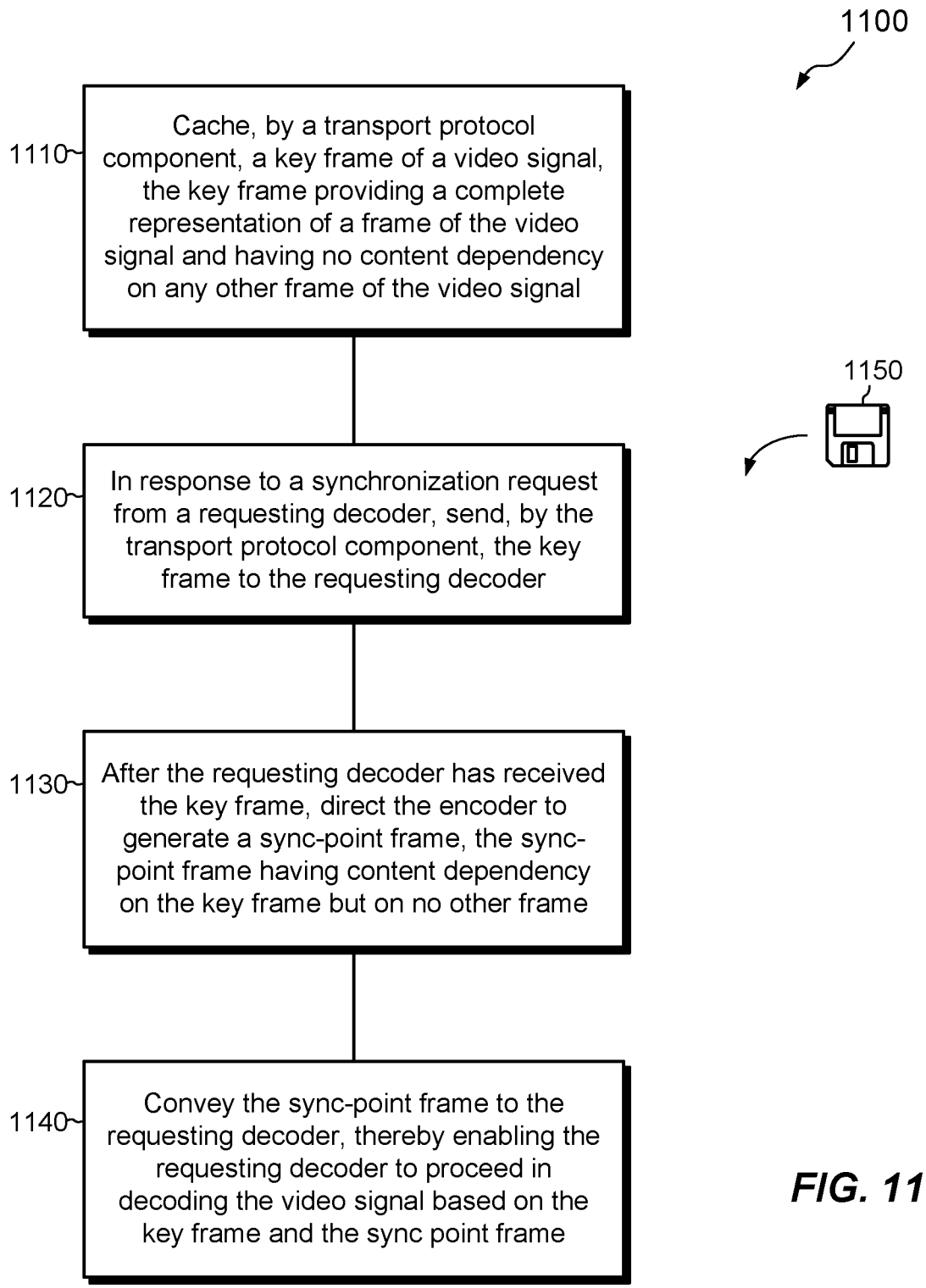
FIG. 11 is a flow chart showing an example method for synchronizing video decoders.

FIG. 11 shows an example method 1100 that may be carried out in connection with the environment 100 and provides a summary of some of the features described above. The method 1100 is typically performed, for example, in a real-time video communication system having an encoder, a set of transport protocol components, and at least one decoder. The particular acts as shown may be performed by the software constructs described in connection with FIG. 2 and/or FIG. 4, which reside in the memory 230 of computing devices 110, and/or the memory 430 of the server 130, and are run by the set of processors 210 and/or 410. The various acts of method 1000 may be ordered in any suitable way. Accordingly, embodiments may be constructed in which acts are performed in orders different from that illustrated, which may include performing some acts simultaneously.

At 1110, the transport component 132/270 caches a key frame 112 of a video signal 140. The key frame 112 provides a complete representation of a frame of the video signal 140 and has no coding dependency on any other frame of the video signal 140.

At 1120, the transport component 132/270 sends the key frame 112 to the requesting decoder 312 in response to a synchronization request 150 from the requesting decoder 312. The requesting decoder 312 may be a late joiner, a stream switcher, or any other decoder requesting to synchronize with a video stream already in progress, including a decoder resynchronizing after a dropped packet or other error.

At 1130, after the requesting decoder 312 has received the key frame 112, the encoder 310 is directed to generate a sync-point frame 190. The sync-point frame 190 has coding dependency on the key frame 112 but on no other frame.

At 1140, the transport server 130/270 conveys the sync-point frame 190 to the requesting decoder 312, thereby enabling the requesting decoder 312 to proceed in decoding the video signal 140 based on the key frame 112 and the sync point frame 190.

Having described certain embodiments, numerous alternative embodiments or variations can be made. For instance, examples have been described in the context of web conferencing and screen sharing. However, these examples are merely illustrative. Alternatively, embodiments hereof may be used in any peer-to-peer, group, or broadcast video scenarios.

Also, embodiments have been described in which a stream switcher requires a new key frame before joining a new stream. This is merely an example, however, as multiple streams operating at different bandwidths may use the same key frames, in which case a stream switcher may already have the needed key frame and may proceed merely by obtaining a new sync-point frame.

Further, although features are shown and described with reference to particular embodiments hereof, such features may be included and hereby are included in any of the disclosed embodiments and their variants. Thus, it is understood that features disclosed in connection with any embodiment are included as variants of any other embodiment.

Further still, the improvement or portions thereof may be embodied as a computer program product including one or more non-transient, computer-readable storage media, such as a magnetic disk, magnetic tape, compact disk, DVD, optical disk, flash drive, solid state drive, SD (Secure Digital) chip or device, Application Specific Integrated Circuit (ASIC), Field Programmable Gate Array (FPGA), and/or the like (shown by way of example as medium 1050 in FIG. 10). Any number of computer-readable media may be used. The media may be encoded with instructions which, when executed on one or more computers or other processors, perform the process or processes described herein. Such media may be considered articles of manufacture or machines, and may be transportable from one machine to another.

As used throughout this document, the words "comprising," "including," "containing," and "having" are intended to set forth certain items, steps, elements, or aspects of something in an open-ended fashion. Also, as used herein and unless a specific statement is made to the contrary, the word "set" means one or more of something. This is the case regardless of whether the phrase "set of" is followed by a singular or plural object and regardless of whether it is conjugated with a singular or plural verb. Further, although ordinal expressions, such as "first," "second," "third," and so on, may be used as adjectives herein, such ordinal expressions are used for identification purposes and, unless specifically indicated, are not intended to imply any ordering or sequence. Thus, for example, a second event may take place before or after a first event, or even if no first event ever occurs. In addition, an identification herein of a particular element, feature, or act as being a "first" such element, feature, or act should not be construed as requiring that there must also be a "second" or other such element, feature or act. Rather, the "first" item may be the only one. Although certain embodiments are disclosed herein, it is understood that these are provided by way of example only and that the invention is not limited to these particular embodiments.

Those skilled in the art will therefore understand that various changes in form and detail may be made to the embodiments disclosed herein without departing from the scope of the invention.

What is claimed is:

1. In a real-time video communication system having a video encoder, a set of transport protocol components, and at least one video decoder, a method of synchronizing video decoders, the method comprising:

caching, by a transport protocol component, a key frame of a video signal, the key frame providing a complete representation of a frame of the video signal and having no coding dependency on any other frame of the video signal;

in response to a synchronization request from a requesting decoder, sending, by the transport protocol component, the key frame to the requesting decoder;

after the requesting decoder has received the key frame and after the encoder has produced multiple differentially-encoded frames based on the key frame, directing the encoder to (i) generate a sync-point frame, the sync-point frame having coding dependency on the key frame and on a current frame of the video signal but on no other frame, and (ii) remove other frames from a reference frame buffer of the encoder to ensure that the encoder generates no future frames with reference to frames that the requesting decoder does not possess; and conveying the sync-point frame to the requesting decoder, thereby enabling the requesting decoder to proceed in decoding the video signal based on the key frame and the sync point frame.

2. The method of claim 1, wherein the method further comprises:

prior to sending sync-point frame to the requesting decoder, sending the key frame to another decoder that also receives the video signal; and when sending the sync-point frame to the requesting decoder, also sending the sync-point frame to the other decoder, thereby enabling both decoders to proceed in decoding the video signal based on the key frame and the sync point frame.

3. The method of claim 2, further comprising the transport protocol component applying a flag to the key frame when sending the key frame to the requesting decoder, the flag directing the requesting decoder to store the key frame until the requesting decoder receives a newer key frame.

4. The method of claim 2, wherein sending the key frame to the requesting decoder is performed in accordance with a reliable protocol, the reliable protocol ensuring that the requesting decoder receives all contents of the key frame by resending any dropped packets of the key frame.

5. The method of claim 4, wherein conveying the sync-point frame to the requesting decoder is performed in accordance with a semi-reliable protocol, the semi-reliable protocol resending any dropped packets of the sync-point frame to the requesting decoder until expiration of a predetermined interval of time, the predetermined interval of time based on a time until a next frame is scheduled to arrive after the sync-point frame.

6. The method of claim 5, further comprising, after sending the sync-point frame to the requesting decoder, sending additional differentially-encoded frames to the requesting decoder, the additional differentially-encoded frames including a first set of differentially-encoded frames to be referenced when decoding other frames and a second set of differentially-encoded frames not to be referenced when decoding other frames,
wherein sending the first set of differentially-encoded frames is performed in accordance with the semi-reliable protocol, and
wherein sending the second set of differentially-encoded frames is performed in accordance with another protocol that does not resend dropped packets.

7. The method of claim 6, further comprising providing an index with each frame sent to the requesting decoder, the index identifying a level of reliability for processing packets of that frame by the requesting decoder, such that the requesting decoder can determine whether to request any dropped packet of a frame based on the index that the requesting decoder received for that frame.

8. The method of claim 7, further comprising transmitting packets of different index values on respective physical connections, such that packets having a first index value are transmitted on a first physical connection and packets having a second index value are transmitted on a second physical connection.

9. The method of claim 2, wherein the requesting decoder is a late joiner to a video stream already in progress, and wherein the sync-point frame sent to the requesting decoder is the first frame rendered by the requesting decoder after joining the video stream.

10. The method of claim 2, wherein the requesting decoder is a stream switcher that is switching from a first video stream requiring a first connection bandwidth to a second video stream requiring a second connection bandwidth, and wherein the sync-point frame sent to the requesting decoder is the first frame rendered by the requesting decoder after switching to the second video stream.

11. The method of claim 2, wherein the synchronization request is received from the requesting decoder after the requesting decoder has failed to receive a packet of frame information from the transport server, and wherein the sync-point frame enables the requesting decoder to continue rendering the video signal by referencing the key frame and no other frames.

12. The method of claim 1, wherein the method further comprises caching the key frame in a transport component of a computing device in which the requesting decoder is operated.

13. A video communication system comprising an encoder, a set of transport protocol components, and at least one decoder, the video communication system constructed and arranged to:
cache, by a transport protocol component, a key frame of a video signal, the key frame providing a complete representation of a frame of the video signal and having no coding dependency on any other frame of the video signal;
receive, by the transport protocol component, a synchronization request from a requesting decoder;
in response to receiving the synchronization request, provide, by the transport protocol component, the key frame to the requesting decoder;
after receiving the key frame and after the encoder has produced multiple differentially-encoded frames based on the key frame, request, by the requesting decoder, a sync-point frame;
generate, by the encoder, the sync-point frame, the sync-point frame having coding dependency on the key frame and on a current frame of the video signal but on no other frame;
remove, by the encoder, other frames from a reference frame buffer of the encoder to ensure that the encoder generates no future frames with reference to frames that the requesting decoder does not possess:
convey the sync-point frame to the requesting decoder; and
decode, by the requesting decoder, the video signal based on the key frame and the sync point frame.

14. The video communication system of claim 13, further constructed and arranged to:
store, by the encoder and by each decoder that receives the video signal, a respective copy of the key frame;
send, by the encoder, multiple chunks of video sequences to each decoder, each chunk including multiple video frames, a first frame of each chunk providing a new sync-point frame generated by the encoder based on a difference between a current frame and the copy of the key frame stored in the encoder; and
decode, by each decoder, each of the multiple chunks by decoding frames based on the copy of the key frame stored in that decoder and the sync-point frame received for the respective chunk.

15. The video communication system of claim 13, further constructed and arranged to:
store, by the encoder, the key frame as a reference frame in un-encoded form; and
in response to the request by the requesting decoder for a sync-point frame, generate, by the encoder, the sync-point frame as a new frame based on a difference between a current frame and the key frame provided as a reference frame.

16. The video communication system of claim 13, further constructed and arranged to:
store, by the encoder, the key frame in encoded form; and
in response to the request by the requesting decoder for a sync-point frame, provide the encoded key frame as an input to the encoder, such that a next frame generated by the encoder is the sync-point frame based on a current frame and the encoded key frame.

17. The video communication system of claim 16, wherein the encoder includes a main loop for performing residual-based encoding, the main loop including a transform block, a quantization block and an inverse-transform block, and wherein the video communication system is further constructed and arranged to provide the encoded key frame as input to the encoder by (i) entropy decoding the encoded key frame and (ii) injecting the entropy-decoded key frame into the main loop as input to the inverse-transform block.

18. A computer program product including a set of non-transitory, computer-readable media having instructions which, when executed by control circuitry of a computerized apparatus, cause the control circuitry to perform a method for synchronizing video decoders, the method comprising:
caching a key frame of a video signal, the key frame providing a complete representation of a frame of the video signal and having no coding dependency on any other frame of the video signal;

in response to a synchronization request from a requesting decoder, sending, the key frame to the requesting decoder; and after the requesting decoder has received the key frame and after the encoder has produced multiple differentially-encoded frames based on the key frame, directing the encoder to (i) generate a sync-point frame, the sync-point frame having coding dependency on the key frame and on a current frame of the video signal but on no other frame and (ii) remove other frames from a reference frame buffer of the encoder to ensure that the encoder generates no future frames with reference to frames that the requesting decoder does not possess, the control circuitry then conveying the sync-point frame to the requesting decoder, thereby enabling the requesting decoder to proceed in decoding the video signal based on the key frame and the sync point frame.

19. The computer program product of claim 17, wherein the method further comprises:

prior to sending sync-point frame to the requesting decoder, sending the key frame to another decoder that also receives the video signal; and when sending the sync-point frame to the requesting decoder, also sending the sync-point frame to the other decoder, thereby enabling both decoders to proceed in decoding the video signal based on the key frame and the sync point frame.

20. The computer program product of claim 19, wherein sending the key frame to the requesting decoder is performed in accordance with a reliable protocol, the reliable protocol ensuring that the requesting decoder receives all contents of the key frame by resending any dropped packets of the key frame, and wherein conveying the sync-point frame to the requesting decoder is performed in accordance with a semi-reliable protocol, the semi-reliable protocol resending any dropped packets of the sync-point frame to the requesting decoder until expiration of a predetermined interval of time, the predetermined interval of time based on a time until another frame is scheduled to arrive after the sync-point frame.

21. The computer program product of claim 19, wherein the requesting decoder is a late joiner to a video stream already in progress, and wherein the sync-point frame sent to the requesting decoder is the first frame rendered by the requesting decoder after joining the video stream.

22. The computer program product of claim 19, wherein the requesting decoder is a stream switcher that is switching from a first video stream requiring a first connection bandwidth to a second video stream requiring a second connection bandwidth, and wherein the sync-point frame sent to the requesting decoder is the first frame rendered by the requesting decoder after joining the second video stream.

23. The computer program product of claim 19, wherein the synchronization request is received from the requesting decoder after the requesting decoder has failed to receive a scheduled packet of frame information, and wherein the sync-point frame enables the requesting decoder to continue rendering the video signal by referencing only the key frame.

* * * * *